United States Patent [19]

Mozingo

[11] 4,026,164
[45] May 31, 1977

[54] BRAKE PEDEL ASSEMBLY

[75] Inventor: Robert Eugene Mozingo, Burlington, Iowa

[73] Assignee: J. I. Case Company, Racine, Wis.

[22] Filed: Feb. 26, 1976

[21] Appl. No.: 661,712

[52] U.S. Cl. .................. 74/478; 74/478.5; 74/480 R; 74/512; 74/529; 74/539; 74/562.5

[51] Int. Cl.² .............. G05G 1/14; G05G 9/00; G05G 11/00

[58] Field of Search ............ 74/474, 478, 478.5, 74/480 R, 512, 529, 539, 560, 562, 562.5

[56] References Cited

UNITED STATES PATENTS

| 787,530 | 4/1905 | McComb | 74/539 |
|---|---|---|---|
| 2,504,258 | 4/1950 | Elenewicz | 74/478.5 X |
| 2,989,875 | 6/1961 | Torrance | 74/478 |
| 3,267,765 | 8/1966 | Stohler | 74/480 |
| 3,343,428 | 9/1967 | Hackbarth | 74/478 |
| 3,935,932 | 2/1976 | Moorhouse | 74/480 R X |

FOREIGN PATENTS OR APPLICATIONS

| 835,840 | 4/1952 | Germany | 74/478.5 |
|---|---|---|---|
| 927,488 | 5/1955 | Germany | 74/480 |

Primary Examiner—Allan D. Herrmann
Attorney, Agent, or Firm—Arthur J. Hansmann

[57] ABSTRACT

A brake pedal assembly including a main brake pedal and a left hand and right hand auxiliary brake pedal pivotally mounted on the main pedal which is in turn pivotally mounted. A cam and link interconnect the auxiliary brake pedals with the main brake pedal, and a lock mechanism is provided for retaining the main brake pedal in the depressed braking position.

5 Claims, 4 Drawing Figures

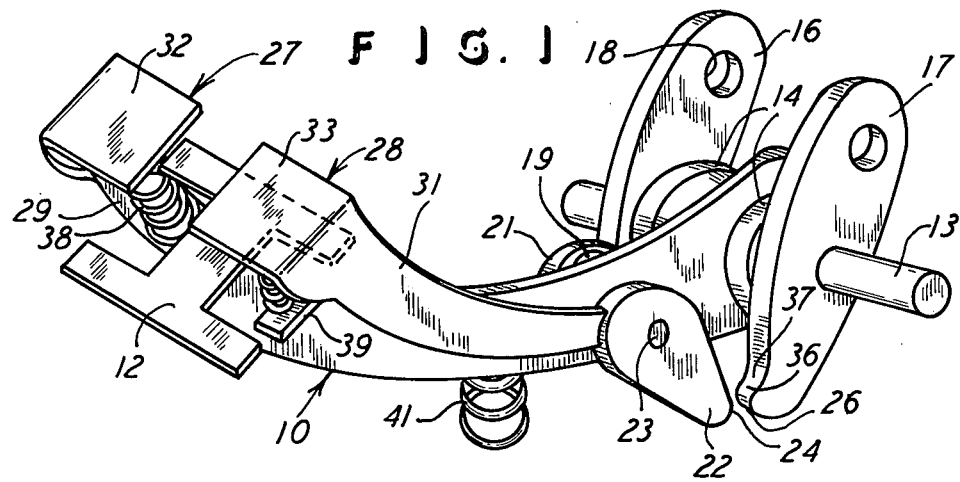
FIG. 1
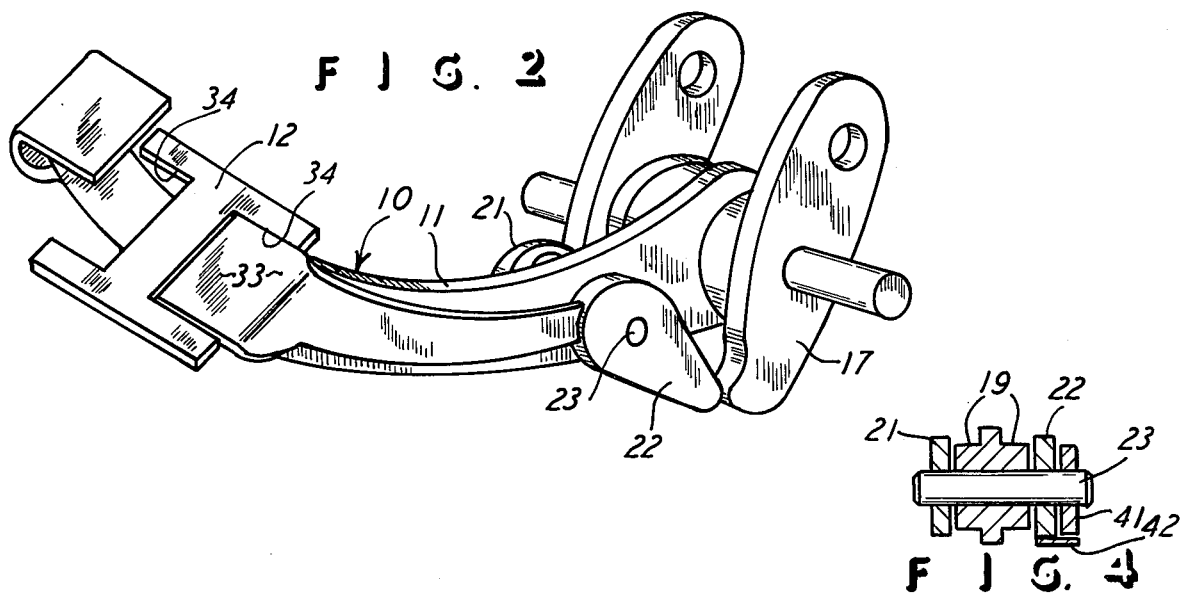
FIG. 2
FIG. 4
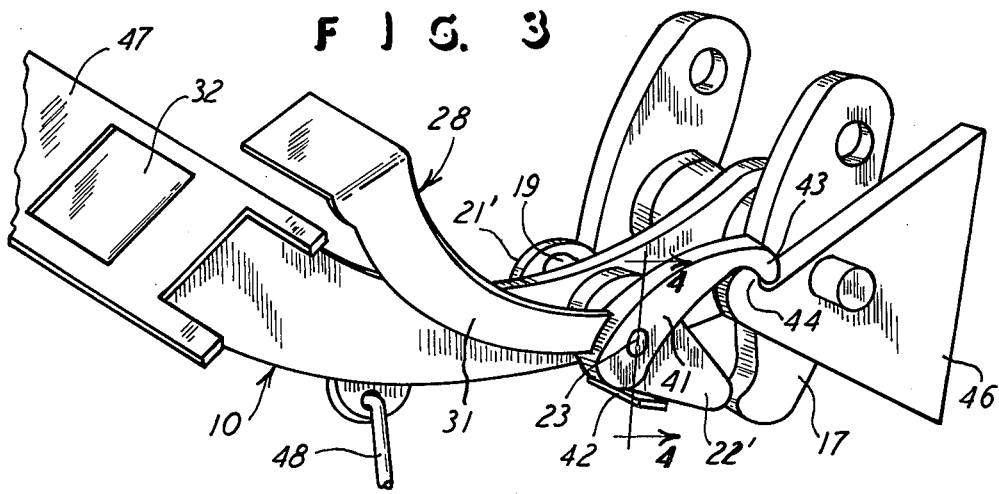
FIG. 3

BRAKE PEDEL ASSEMBLY

This invention relates to a brake pedal assemly such as that employed in a tractor having brakes on the right side and left side of the tractor, with separate and independent actuating means for the respective sides.

BACKGROUND OF THE INVENTION

Certain vehicles, such as tractors, are employed with brakes on the left hand side and on the right hand side, and the two sides have separate lines or brake subassemblies whereby the front and rear left wheels can be braked separate and independent from the front and rear right wheels of the tractor. With this brake arrangement, the wheels on either the left side and/or the right side of the vehicle can be applied individually. Thus, in the event the brakes were applied only on the right hand side of the vehicle, then the vehicle could be turned to the right about a very small turning radius, as desired. However, it is frequently desired that the brakes on both sides of the vehicle, that is on all four of the vehicle wheels, be applied simultaneously, and that would be for normal stopping of the vehicle and without regard to a brake or skid type of turning as mentioned above.

Accordingly, the present invention provides a brake pedal assembly which is particularly suitable for tractor brakes where the brakes are applied separately on the right hand side and on the left hand side of the tractor. In accomplishing this objective, the brake pedals of this invention are incorporated in a single assembly which permits the left hand and right hand brake pedals to be assembled with the main brake pedal, and this improves upon and simplifies the arrangement of the brake pedals. Still further, the present invention provides a sturdy and reliable brake pedal assembly, for the purposes mentioned above, and the left hand and right hand brake pedals are mounted directly on a main brake pedal for the reliable and compact assembly.

Still further, it is an object of this invention to provide a brake pedal assembly wherein there are left hand and right hand brake pedals, and these pedals are incorporated with a main brake pedal, and the entire arrangement is such that the operator can selectively depress either the left hand or the right hand pedal, and the operator can also depress both the aforementioned pedals and also the main pedal, all in one motion and with one foot, when and if such is desired.

Additionally, the present invention provides a brake pedal assembly which utilizes the left hand and right hand brake pedals, and the main brake pedal, all as mentioned above, and the invention incorporates a lock mechanism wherein the brake pedals can be secured in the depressed and locked position, without requiring the foot pressure from the operator. Still further, in accomplishing this objective, the brake pedals can be readily and easily placed in the locked position, and they can also be readily and easily released from the locked position, all with a very simple maneuvering by the operator's foot.

It is an objective of this invention to provide a brake pedal assembly for separate right and left hand wheel braking and to simultaneously apply uniform braking action to both sides of a vehicle.

Further, the brake pedal assembly of this invention can be employed for applying braking force and for actuating other mechanisms such as clutches and decelerators.

Other objects and advantages will become apparent upon reading the following description in light of the accompanying drawings.

BRIEF DESCRIPTION OF THE DRAWINGS

FIG. 1 is a perspective view of the brake assembly of this invention.

FIG. 2 is a perspective view of the assembly shown in FIG. 1, but with the right hand brake pedal shown in the depressed position.

FIG. 3 is a perspective view of the assembly shown in FIG. 1, but with the assembly being in the locked position and having a slightly different arrangement of parts from that shown in FIG. 1.

FIG. 4 is a sectional view taken along the line 4—4 of FIG. 3.

DETAILED DESCRIPTION OF THE PREFERRED EMBODIMENT

FIGS. 1 and 2 show a main brake pedal 10 having a pedal arm 11 and a pedal pad 12 affixed to the arm and being of an H-shape as seen from above in FIGS. 1 and 2. The main brake pedal 10 is rotatably mounted on the pedal pivot shaft 13 which is suitably fixedly mounted on a tractor, not shown herein. The pedal arm 10 has circular bosses 14 through which the shaft 13 extends for pivotally mounting the arm 10, and two brake link members 16 and 17 are also pivotally mounted on the shaft 13. The links or levers 16 and 17 have openings 18 therein, and it will be understood by one skilled in the art that the brake mechanism, such as a pin or rod, extends into the openings 18 and to a location for actuating the brake members themselves which are not shown herein but which of course would be on the wheels of the tractor or like vehicle. Thus, the shaft 13 is fixedly mounted, and the arm 10 pivots about the longitudinal axis of the shaft 13, and also the links 16 and 17 are free to pivot about the longitudinal axis of the shaft 13, and the links 16 and 17 are not connected with the arm 10 nor with the shaft 13 in that the links 16 and 17 pivot freely and independently of the arm 10 and shaft 13.

The arm 10 also has bosses 19 extending to opposite sides of the arm 10, comparable to the lateral extent of the aforesaid bosses 14, and cam members 21 and 22 are disposed adjacent the bosses 19 and are pivotally mounted on the main brake arm 10 by means of a pivot pin 23. Thus, the cams 21 and 22 are pivotal relative to the main brake arm 10, and they actually pivot about the longitudinal axis of the mounting pin 23 extending through the brake arm 10 and through the pivotal cams 21 and 22. With this arrangement, the cams 21 and 22 respectively align with the links 16 and 17, and the cams have surfaces 24 which engage the link surfaces 26 when the cams 21 and 22 have been pivoted counterclockwise, as viewed in these drawings. Left and right hand brake pedals 27 and 28 are respectively integrally connected with the cams 21 and 22 for inducing the pivot motion of the cams, as mentioned. Thus, the brake pedals 27 and 28 are auxiliary brake pedals and include the arms 29 and 31 and the pads 32 and 33, respectively.

It will be seen that the auxiliary brake pedals 32 and 33 are of a square shape in plan view, and the overall size is such that they nest with the main brake pedal pad 12 by being received within the openings 34 formed by the H-shape of the main brake pedal pad 12, and such nesting is indicated with the right hand brake pad 33 in FIG. 2. Therefore, depressing the right hand brake pedal 28, to the FIG. 2 position, will rotate or pivot the cam 22 to a point of contact with the link 17, as shown in FIG. 2, and this movement will thereby interconnect the main brake pedal 10 with the link 17, all through the cam 22 and its pivot pin 23. Further depressing of the right hand brake pedal 28, that is beyond the position shown in FIG. 2, will depress the main brake pedal 10, and that will cause rotation of the link 17 about the mounting pin 13, and thus the right hand brakes of the tractor would be applied, as desired.

It will therefore also be seen and understood that the operator can depress either the right hand brake pedal 28 or the left hand brake pedal 27, selectively, to apply the brake on the right hand side of the tractor or on the left hand side of the tractor, as desired. Further, the operator can depress both brake pedals 27 and 28 simultaneously, and this can be accomplished with a single foot, and then the main brake pedal 10 will be depressed and the brakes on both sides of the tractor will be simultaneously applied. In this arrangement, the links 16 and 17 are designated respective brake actuators, relative to the left hand and right hand pedals 27 and 28; and the cam members 21 and 22 are designated interlock members which are interconnectable between the auxiliary brake pedals and the respective actuators 16 and 17, all for engaging the main brake pedal 10 with the actuators 16 and 17, as desired. Of course the auxiliary brake pedals 27 and 28 are spaced apart and are therefore discrete and can be separately actuated, and all the brake foot pads described are arranged and shaped to nest together in one common plane when the auxiliary foot pads 32 and 33 are depressed to a plane of alignment with the main brake pedal foot pad 12. In this arrangement, the links 16 and 17 have their operating surfaces 26 arranged with the depression 36 so that the cam end surfaces 24 will nest in the depression 36 and then engage the links 16 and 17 at the surface 37 to thereby effect the interconnection between the cams 21 and 22 and the links 16 and 17, respectively.

Without foot pressure on the brake pedal pads 32 and 33, the pads of course assume the position shown in FIG. 1, and this position is achieved by virtue of compression springs 38 shown underneath the pads 32 and 33 and supported on a shelf 39 extending from the side of the main brake pedal arm 11, to thereby have the springs 38 urge the auxiliary brake pedals into the upper and inoperative position shown in FIG. 1. Also, a compression spring 41 can be effective on the main brake pedal 10 to pivot it upwardly and into the inoperative position.

FIGS. 3 and 4 shown an arrangement of the brake assembly wherein a lock mechanism is utilized for retaining the main brake pedal 10 in the depressed or brake securing position. A latch 41 is affixed to the right hand brake pedal 28 and is pivotal on the pin 23 so that the latch 41 and pedal 28 pivot as a unit about the longitudinal axis of the pin 23. In this arrangement, the cam 22' is not now affixed with the right hand brake pedal arm 31, but instead the cam 22' is free to pivot on the pin 23 independent of the movement of the brake pedal 28 except that a projection 42 is affixed to the cam 22' and is engaged by the undersurface of the latch 41 when the brake pedal 28 is depressed, and thus the cam 22' is then pivoted counterclockwise when the brake pedal 28 is depressed to a certain limit. Accordingly, upon depressing the brake pedal 28 a sufficient amount, the cam 22 is engaged, through its projection 42, and is pivoted along with the movement of the brake pedal 28, and the cam 22' then engages the actuator or link 17. In that manner, the desired interconnection between the main brake pedal 10 and the link 17 can be achieved. Also, the latch 41 is utilized for securing the main brake pedal 10 in the then depressed position, and this is accomplished by having the latch 41 arranged with a hook 43 on its extending end, and the hook engages a companion hook 44 on a member 46 which is in a fixed position on the vehicle. That is, after depressing both auxiliary brake pedals 27 and 28 and the main brake pedal 10, the brakes are all engaged and the latch 41 has moved upwardly past the hook 44. Release of the right hand brake pedal 28, while holding the left hand brake pedal 27 and the main brake pedal 10 in the depressed position, will permit the latch 41 to become secured with the hook 44, and thus the main brake pedal 10 is held in the depressed position and this therefore secures all of the brakes in the locked position, as then desired. Of course the geometry of the latch 41 and the member 46 with its hook 44 is such that the latch 41 will not be in the latched or locked condition shown in FIG. 3 unless and until the main brake pedal 10 has been depressed and then the right hand brake pedal 28 has been released, which is the position shown in FIG. 3. In that position, the operator has completely removed his foot from the brake pedals, and the main brake pedal 10 remains in the depressed and braking position shown.

FIG. 3 also shows that the main brake 10 could be provided with an extension 47 on its brake pad 12, and that would permit depressing the main brake pedal 10 without initial depressing of either auxiliary brake pedals 27 or 28. In that arrangement, the main brake pedal 10 could have a connector 48 which could lead to a clutch or clutch cutout or decelerator (not shown but being of a conventional arrangement understood by one skilled in the art) and thus the pedal assembly could be utilized for this additional connection and function.

Accordingly, this invention provides a brake pedal assembly which has left and right hand auxiliary pedals interconnected with a main brake pedal such that the auxiliary pedals can be used separately and independently, and also the brakes on both the left hand and right hand side of the vehicle can be applied simultaneously and uniformly by depressing the auxiliary pedals and the main brake pedal, all in one motion. In this arrangement, the auxiliary pedals have a lost motion relationship and connection relative to the brake links 16 and 17, and thus, for instance, when the right hand brake pedal 28 is depressed to the position shown in FIG. 2 it engages the link 17, and further depressing of the main brake pedal 10 will of course cause pivotal movement of the left hand brake pedal 27 but the left hand brake pedal will not be engaged with its link 16, and thus only the brakes on the right hand side will be applied, and this is by virtue of the lost motion connection mentioned.

What is claimed is:

1. A brake pedal assembly comprising a main brake pedal, an auxiliary right hand brake pedal and an auxiliary left hand brake pedal with each pivotally associated with and separately movable relative to said main brake pedal, a respective brake actuator movably mounted relative to each said auxiliary pedal, and a respective interlock member operatively associated with each of said auxiliary pedals and disposed adjacent said respective brake actuator and being normally free of connection with said respective brake actuator and being movable in accordance with the movement of said respective auxiliary brake pedal and thereby be interconnectable between each said actuator and said auxiliary pedals upon depressing the latter for respectively interconnecting said main brake pedal with the respective said actuator in response to depressing a respective one of said auxiliary pedals.

2. The brake pedal assembly as claimed in claim 1, wherein said auxiliary brake pedals are pivotally mounted on opposite sides of said main brake pedal, and foot pads on all said pedals and with said foot pads on said auxiliary pedals being spaced apart a distance sufficient for selective separate and joint single foot action depressing by the operator, and with the spacing between said foot pads on said auxiliary pedals being within the span of the operator's foot and being spaced sufficiently close together to preclude depressing of said foot pad on said main brake pedal with the operator's foot between said auxiliary foot pads.

3. The brake pedal assembly as claimed in claim 1, wherein each said interlock member is a cam affixed with each said auxiliary brake pedal and being normally spaced free of the respective said actuator and thereby present a lost motion connection therewith, and each said actuator is a link having a cam surface in interference with limited movement of said cam for interconnecting said auxiliary pedals with said main brake pedal, and said pedals having pads spaced from each other a distance sufficient that said auxiliary brake pedals can be actuated separately and independently of each other and said main brake pedal can be actuated only with either of said auxiliary brake pedals.

4. The brake pedal assembly as claimed in claim 1, including brake lock mechanism operatively associated with said auxiliary pedals for securing said main pedal in a depressed position.

5. The brake pedal assembly as claimed in claim 4, wherein said brake lock mechanism includes a latch interconnectable between said main brake pedal and said auxiliary brake pedal and including a latch retainer for securing said latch in a locked position to lock said main brake pedal.

* * * * *